(12) United States Patent
Gahnoog et al.

(10) Patent No.: US 10,986,099 B2
(45) Date of Patent: *Apr. 20, 2021

(54) MULTICOMPUTER PROCESSING OF USER DATA WITH CENTRALIZED EVENT CONTROL

(71) Applicant: Bank of America Corporation, Charlotte, NC (US)

(72) Inventors: Mohamed A. Gahnoog, Charlotte, NC (US); Cameron Darnell Wadley, Waxhaw, NC (US); Minh N. Vuong, Clovis, CA (US); Gail R. Davis, Yuma, AZ (US); Victoria L. Dravneek, Charlotte, NC (US); Susan Varghese, Atlanta, GA (US); William August Stahlhut, The Colony, TX (US); Katherine Dintenfass, Lincoln, RI (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/574,609

(22) Filed: Sep. 18, 2019

(65) Prior Publication Data
US 2020/0014700 A1 Jan. 9, 2020

Related U.S. Application Data

(63) Continuation of application No. 15/783,671, filed on Oct. 13, 2017, now Pat. No. 10,462,150.

(51) Int. Cl.
*H04L 29/06* (2006.01)
*G06Q 20/40* (2012.01)
(Continued)

(52) U.S. Cl.
CPC ........... *H04L 63/102* (2013.01); *G06N 20/00* (2019.01); *G06Q 20/405* (2013.01); *G06Q 40/02* (2013.01); *H04L 63/105* (2013.01); *H04L 67/10* (2013.01)

(58) Field of Classification Search
CPC ..... H04L 63/102; H04L 63/105; H04L 67/10; G06Q 20/405; G06Q 40/02; G06N 20/00
(Continued)

(56) References Cited

U.S. PATENT DOCUMENTS

| 6,173,269 | B1 | 1/2001 | Solokl et al. | |
|---|---|---|---|---|
| 7,043,230 | B1 * | 5/2006 | Geddes | H04L 63/18 455/410 |

(Continued)

OTHER PUBLICATIONS

NPL Search Results 2020 (Year: 2020).*
NPL Search Terms (Year: 2021).*

*Primary Examiner* — Syed A Zaidi
(74) *Attorney, Agent, or Firm* — Banner & Witcoff, Ltd.; Michael A. Springs

(57) ABSTRACT

Aspects of the disclosure relate to multicomputer processing of data from social media service computing platforms and other sources with centralized event control. A first computing platform may receive a request to authorize an event from a first device as well as information from one or more social media service computing platforms. The first computing platform may determine whether or not to authorize the event and may request authorization for the event from a second device. Subsequently, the first computing platform may command a second computing platform to authorize or not authorize the event accordingly. The rules and conditions evaluated by the first computing platform in determining whether or not to authorize the event may be determined or altered by a machine learning engine of the first computing platform.

20 Claims, 8 Drawing Sheets

(51) Int. Cl.
  *G06Q 40/02* (2012.01)
  *G06N 20/00* (2019.01)
  *H04L 29/08* (2006.01)

(58) Field of Classification Search
  USPC .......................................................... 726/4
  See application file for complete search history.

(56) References Cited

U.S. PATENT DOCUMENTS

| | | | |
|---|---|---|---|
| 7,100,195 | B1 | 8/2006 | Underwood |
| 7,143,064 | B2 | 11/2006 | Picciallo et al. |
| 7,171,382 | B2 | 1/2007 | Beacham |
| 7,653,595 | B2 | 1/2010 | Picciallo et al. |
| 8,127,982 | B1 | 3/2012 | Casey et al. |
| 8,145,573 | B2 | 3/2012 | Hill |
| 8,290,866 | B1 | 10/2012 | Little |
| 8,459,544 | B2 * | 6/2013 | Casey ............... G06Q 20/2295 235/379 |
| 8,571,986 | B2 | 10/2013 | Dooley Maley et al. |
| 8,583,554 | B2 | 11/2013 | Dooley Maley et al. |
| 9,075,868 | B2 | 7/2015 | Mehanna et al. |
| 9,519,932 | B2 | 12/2016 | Calman et al. |
| 9,524,524 | B2 | 12/2016 | Calman et al. |
| 9,684,905 | B1 | 6/2017 | Haller et al. |
| 2002/0073029 | A1 | 6/2002 | Cheaib et al. |
| 2002/0152179 | A1 | 10/2002 | Racov |
| 2002/0174075 | A1 | 11/2002 | Mirlas et al. |
| 2002/0181710 | A1 | 12/2002 | Adam et al. |
| 2003/0042301 | A1 | 3/2003 | Rajasekaran et al. |
| 2003/0061111 | A1 | 3/2003 | Dutta et al. |
| 2004/0039694 | A1 | 2/2004 | Dunn et al. |
| 2004/0143527 | A1 | 7/2004 | Benkert et al. |
| 2004/0158532 | A1 | 8/2004 | Breck et al. |
| 2004/0177047 | A1 | 9/2004 | Graves et al. |
| 2007/0118475 | A1 * | 5/2007 | Picciallo ............ G06Q 30/0603 705/42 |
| 2007/0136197 | A1 * | 6/2007 | Morris ................. G06Q 40/02 705/44 |
| 2009/0106158 | A1 * | 4/2009 | Hill ..................... G06Q 20/367 705/66 |
| 2012/0022969 | A1 * | 1/2012 | Collas ................. G06Q 30/00 705/26.41 |
| 2012/0136780 | A1 | 5/2012 | El-Awady et al. |
| 2012/0143761 | A1 * | 6/2012 | Doran .................. G06Q 20/40 705/44 |
| 2012/0150673 | A1 | 6/2012 | Hart |
| 2013/0018792 | A1 | 1/2013 | Casey et al. |
| 2014/0074748 | A1 | 3/2014 | Xie |
| 2015/0046327 | A1 * | 2/2015 | Taupitz ............... G06Q 20/367 705/44 |
| 2015/0106216 | A1 | 4/2015 | Kenderov |
| 2015/0120555 | A1 | 4/2015 | Jung et al. |
| 2016/0162882 | A1 | 6/2016 | McClung, III |
| 2016/0210626 | A1 | 7/2016 | Ortiz et al. |
| 2016/0350846 | A1 | 12/2016 | Dintenfass et al. |
| 2017/0316405 | A1 | 11/2017 | Lonni et al. |

* cited by examiner

MULTICOMPUTER PROCESSING OF USER DATA WITH CENTRALIZED EVENT CONTROL

CROSS REFERENCE TO RELATED APPLICATIONS

This application is a continuation of and claims priority to co-pending U.S. application Ser. No. 15/783,671, filed Oct. 13, 2017, and entitled "Multicomputer Processing of User Data with Centralized Event Control," which is incorporated hereby by reference in its entirety.

BACKGROUND

Aspects of the disclosure relate to electrical computers, digital processing systems, and multicomputer data processing. In particular, one or more aspects of the disclosure relate to enabling multicomputer processing of data from social media service computing platforms with centralized event control

SUMMARY

Aspects of the disclosure provide effective, efficient, scalable, and convenient technical solutions that address and overcome the technical problems associated with optimizing, maintaining, and utilizing computer systems and services. In particular, one or more aspects of the disclosure relate to techniques for enabling interactive and customizable controls for a supervisory user computing device with respect to interactions between a subordinate user computing device and a computing platform.

In accordance with one or more embodiments, a computing platform having at least one processor, a memory, and a communication interface may establish, via the communication interface, a first connection to a subordinate user computing device. While the first connection is established, the event control computing platform may receive a request to authorize an event from the subordinate user computing device. Subsequently, the event control computing platform may establish, via the communication interface, a second plurality of connections to a plurality of social media service computing platforms. While the second plurality of connections is established, the event control computing platform may receive first information from at least one of the plurality of social media service computing platforms. The event control computing platform may then determine, based on the request and the first information, to authorize the request. Next, the event control computing platform may, in response to determining to authorize the request, generate a command directing an event validation computing platform authorize the event. Finally, the event control computing platform may transmit, via the communication interface, to the event validation computing platform, the command directing the event validation computing platform to authorize the event, wherein transmitting the command directing the event validation computing platform to authorize the event causes the event validation computing platform to execute one or more actions enabling the subordinate user computing device to initiate the event.

In some embodiments, the event control computing platform may transmit, prior to transmitting the command, to a supervisory user computing device associated with a supervisory user, a request for supervisory authorization of the event. In other embodiments, the event control computing platform may receive, from the supervisory user computing device associated with a supervisory user, a command instructing the computing platform to authorize the event. Then, the computing platform may compare the request for supervisory authorization of the event with the command received from the supervisory user computing device instructing the computing platform to authorize the event, and in response, determine, based on the comparing of the request for supervisory authorization of the event with the command received from the supervisory user computing device instructing the computing platform to authorize the event, at least one difference between the request for supervisory authorization of the event and the command received from the supervisory user computing device instructing the computing platform to authorize the event. Next, the computing platform may, prior to transmitting the command directing the event validation computing platform to authorize the event, modify, based on the at least one difference, the command directing the event validation computing platform to authorize the event.

Further still, the event control computing platform may establish, via the communication interface, a third connection to the event validation computing platform, and while the third connection is established, receive, via the communication interface, from the event validation computing platform, a plurality of authorization rules. Then, the computing platform may compare the request to authorize the event to each of the plurality of authorization rules, and prior to determining to authorize the request, determine that the request to authorize the event satisfies each of the plurality of authorization rules. In some aspects, the computing platform may reprogram functionality of the computing platform, using a machine learning engine, to alter at least one of the plurality of authorization rules based on additional information received from the plurality of social media service computing platforms.

In some embodiments, the event control computing platform may identify a first characteristic of the first information, and identify a second characteristic of the request to authorize the event, wherein the second characteristic is related to the first characteristic. Then, the computing platform may compare the first characteristic of the first information with the second characteristic of the request to authorize the event, and verify, based on the comparing of the first characteristic of the first information with the second characteristic of the request to authorize the event, and prior to determining to authorize the request, that the first characteristic of the first information verifies at least one characteristic of the request to authorize the event is accurate.

In some aspects, the command directing the event validation computing platform to authorize the event comprises a one-time use authorization token corresponding to the event, and wherein transmitting the command directing the event validation computing platform to authorize the event further causes the event validation computing platform to execute one or more actions enabling the subordinate user computing device to initiate the event exactly once.

In some embodiments, the event control computing platform may transmit, via the communication interface, to the subordinate user computing device, a notification that the computing platform has transmitted a command directing the event validation computing platform to authorize the event, wherein the notification comprises an identification of the event and at least one piece of information from the command directing the event validation computing platform to authorize the event.

In some aspects, the event control computing platform may record, in a database, an entry corresponding to the event, and the entry may include information associated with the command directing the event validation computing platform to authorize the event. In some aspects, the event control computing platform may compare the request to authorize the event with the command directing the event validation computing platform to authorize the event. Next, the computing platform may determine, based on the comparing of the request to authorize the event with the command directing the event validation computing platform to authorize the event, a second event, and transmit, to the subordinate user computing device, a recommendation for the second event.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
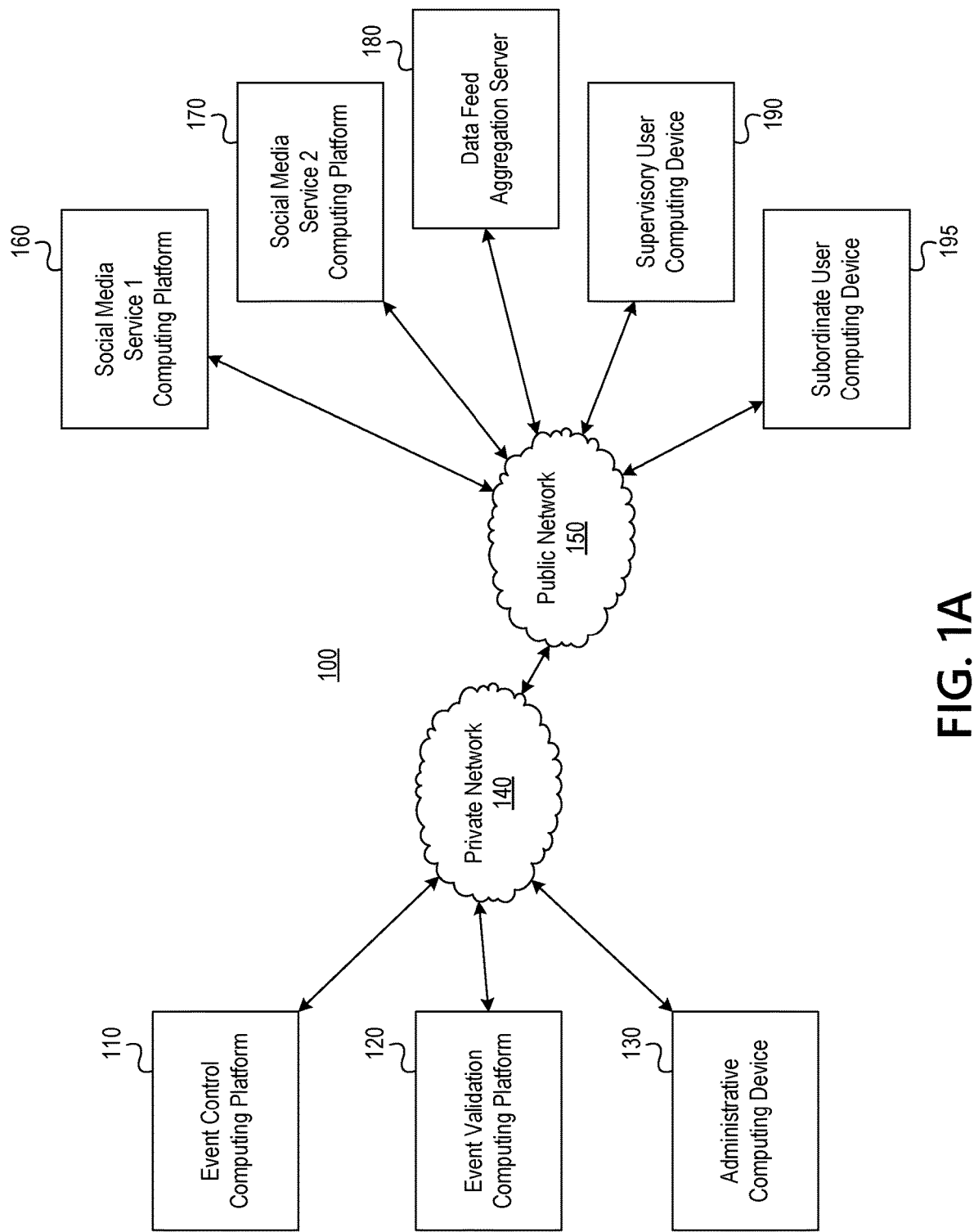
FIGS. 1A and 1B depict an illustrative computing environment for validating and controlling events executed across multiple computing platforms and devices in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Aspects of the disclosure relate to systems and methods for authorizing events. In some embodiments, a system applies various rules to determine if an event should be authorized. Aspects of the disclosure relate to dynamically and autonomously modifying these rules based on various internal and external data sources such as social media data sources. In some embodiments, a supervisory user computing device, which may be used by a parent or guardian user, may selectively authorize purchases or other events initiated using a subordinate user computing device, which may be used by a dependent child or teenager. The system may enable the subordinate user computing device to efficiently complete the transaction at hand and present educational information associated with budgeting and managing funds to the user of the subordinate user computing device.

For example, a user (e.g., a teenager) of a subordinate user computing device may desire to purchase a dress for prom. The dress may be a large purchase, and the user may lack the funds necessary to purchase the dress in her bank account. The subordinate user computing device, operated by the user, may request authorization to access a secondary bank account or line of credit controlled or managed by a supervisory user computing device, which may be operated by a supervisory user such as a parent. For example, the supervisory user computing device may control access to a different source of funds that contains sufficient funds for the purchase of the dress. However, the parent operating the supervisory user computing device may not wish to grant unfettered access to the different source of funds. In this example, then, the subordinate user computing device may request authorization from the supervisory user computing device to use the different funding source to fund the purchase of the dress.

The system may record a transaction event entry in a database in connection with the authorization. For example, the system may provide for a method to record a transaction associated with the authorization. The transaction record may be used, for example, to establish a repayment schedule to transfer funds back to the source of funds used to facilitate the transaction. In an example, the operator of the subordinate user computing device may repay the amount over time, according to parameters established by the supervisory user computing device. One example of parameters for the repayment may include an interest rate and term length. Aspects of the disclosure relate to the system suggesting an interest rate based on, among other things, market rates and previous transaction history of the user of the subordinate user computing device. In this way, the system may provide a mock credit market in which previous transaction history affects future credit rates. As a result, users may learn positive financial habits in a private and safe environment.

In an example, a subordinate user computing device may have access to the funds necessary for a transaction but still be required by the system to receive authorization from a supervisory user computing device to perform the transaction. For example, a parent operating a supervisory user computing device may set a spending limit above which any transaction is required to be authorized by the parent even if a subordinate user computing device has access to sufficient funds to facilitate the transaction. In this way, the supervisory user computing device may monitor and control events initiated by a subordinate user computing device. A supervisory user computing device may similarly pre-authorize or block transactions according to certain rules and require authorization to alter these rules. For example, a transaction with a department store retailer may require authorization while a transaction at a pharmacy may be pre-authorized, or white-listed. An event at the pharmacy may not require authorization while an event at the department store may require authorization. In some examples, some classes or categories of transactions may be black-listed and blocked without requesting authorization. For example, a transaction at a luxury goods retailer may be black-listed such that the transaction is blocked and no authorization is requested.

Spending limits, white-lists, black-lists, and other transaction approval rules and conditions may be dynamically and autonomously updated by the system based on social media information. In an example, a transaction involving an expensive item may be normally blocked by the system due to either a vendor-based rule or a price-based rule. Under these conditions, the system may require authorization for the transaction. However, the system may monitor social media sources and adjust applicable rulesets if an event associated with the transaction is identified. Then, the purchase which would normally require authorization may not require authorization because of an associated with the upcoming event. In this way, the system, which may be embodied in the computing platform discussed below, may intelligently adjust rulesets such that a supervisory user operating a supervisory user computing device is not overburdened by unnecessary or otherwise unwanted transaction authorization requests.

Figure 1B:
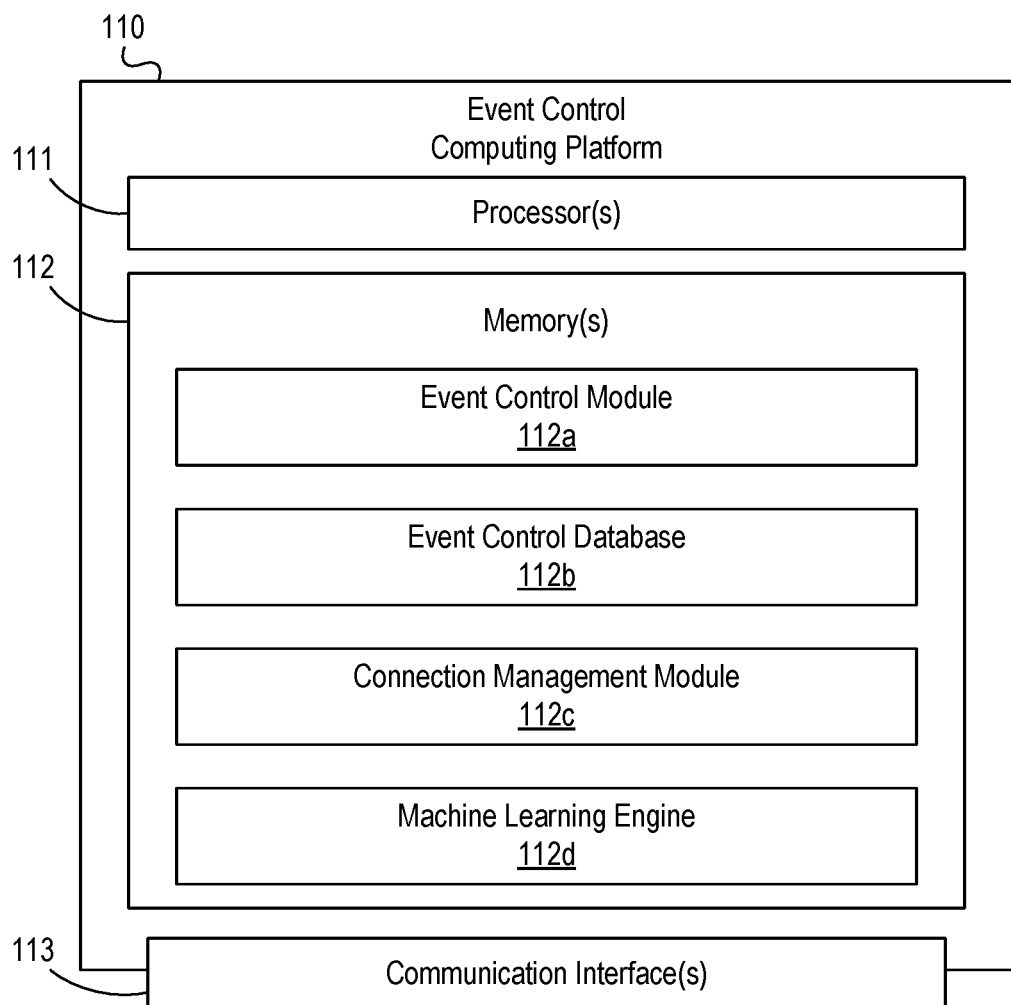

FIGS. 1A and 1B depict an illustrative computing environment for validating and controlling events executed across multiple computing platforms and devices in accordance with one or more example embodiments. Referring to FIG. 1A, computing environment 100 may include one or more computer systems, one or more computer networks, and/or other computing infrastructure. For example, computing environment 100 may include an event control computing platform 110, an event validation computing platform 120, an administrative computing device 130, a private network 140, a public network 150, a first social media service computing platform 160, a second social media service computing platform 170, a data feed aggregation server 180, a supervisory user computing device 190, and a subordinate user computing device 195.

As discussed in greater detail below, event control computing platform 110 may include one or more computing devices configured to perform one or more of the functions described herein. For example, event control computing platform 110 may include one or more computers (e.g., laptop computers, desktop computers, servers, server blades, or the like) that are configured to orchestrate event validation operations and event control operations across multiple computer systems and devices in computing environment 100.

Event validation computing platform 120 may include one or more computing devices configured to validate events based on event data received from event control computing platform 110 and/or from other sources. For example, event validation computing platform 120 may receive, from event control computing platform 110 and/or one or more other systems, event information defining one or more events to be executed in computing environment 100, and event validation computing platform 120 subsequently may authorize and/or otherwise validate the one or more events to be executed in computing environment 100, so as to allow the events to proceed and/or otherwise be executed. In some instances, the one or more events may correspond to one or more financial transactions that have been requested by one or more computing devices, such as supervisory user computing device 190 and/or subordinate user computing device 195, and event validation computing platform 120 may evaluate and/or selectively authorize the requested transactions based on information stored and/or maintained by event validation computing platform 120 (e.g., such as financial account information, account balance information, transaction history information, and/or account rules) and/or based on information received from event control computing platform 110 (e.g., such as user-specific transaction rules, account-specific transaction rules, user-specific trends information, user-segment trends information, and/or other information) and/or one or more other systems.

Administrative computing device 130 may be a desktop computer, laptop computer, workstation, or other computing device that is configured to be used by an administrative user, such as a network administrator associated with an organization operating event control computing platform 110 and/or event validation computing platform 120.

Social media service computing platform 160 may include one or more computing devices configured to host a first social media service (which may, e.g., be provided by an organization different from the organization operating event control computing platform 110 and/or event validation computing platform 120). In some instances, social media service computing platform 160 may maintain user profile information for various users of the first social media service, provide user interfaces associated with the first social media service to various user devices (e.g., supervisory user computing device 190, subordinate user computing device 195), and provide activity feed data to other systems and/or devices included in computing environment 100, such as event control computing platform 110, event validation computing platform 120, data feed aggregation server 180, and/or the like. For instance, social media service computing platform 160 may, in some arrangements, provide activity feed data (e.g., such as user-specific image data, user-specific geolocation data, user-specific likes data, and/or other user-specific data) to event control computing platform 110 to enable one or more functions provided by event control computing platform 110 (e.g., such as social-media-enabled financial-transaction functions).

Social media service computing platform 170 may include one or more computing devices configured to host a second social media service (which may, e.g., be provided by an organization different from the organization operating event control computing platform 110 and/or event validation computing platform 120). Additionally, the second social media service may be different from the first social media service (e.g., the second social media service may be provided by an organization different from the organization providing the first social media service). In some instances, social media service computing platform 170 may maintain user profile information for various users of the second social media service, provide user interfaces associated with the second social media service to various user devices (e.g., supervisory user computing device 190, subordinate user computing device 195), and provide activity feed data to other systems and/or devices included in computing environment 100, such as event control computing platform 110, event validation computing platform 120, data feed aggregation server 180, and/or the like. For instance, social media service computing platform 170 may, in some arrangements, provide activity feed data (e.g., such as user-specific image data, user-specific geolocation data, user-specific likes data, and/or other user-specific data) to event control computing platform 110 to enable one or more functions provided by event control computing platform 110 (e.g., such as social-media-enabled financial-transaction functions).

Data feed aggregation server 180 may include one or more computing devices configured to aggregate data feeds from various source systems (e.g., social media service computing platform 160, social media service computing platform 170, and/or other sources) and/or communicate data feeds to various destination systems (e.g., event control computing platform 110). In some instances, data feed aggregation server 180 may receive social media activity feed data from various social media platforms (e.g., social media service computing platform 160, social media service computing platform 170), merchant offer data from various merchant platforms (e.g., defining one or more merchant-specific offers that may be redeemable by customers at such merchants), and/or other activity data and/or content from other sources, and data feed aggregation server 180 may aggregate any and/or all of the received data to produce an aggregated data feed. Subsequently, data feed aggregation server 180 may communicate and/or otherwise provide the aggregated data feed to one or more destination systems, such as event control computing platform 110, so as to enable one or more functions provided by event control computing platform 110 (e.g., such as social-media-enabled financial-transaction functions). In some instances, the aggregated data feed may be communicated by data feed aggregation server 180 to event control computing platform 110 via a secure and/or encrypted communications link established between event control computing platform 110 and data feed aggregation server 180.

Supervisory user computing device 190 may be a desktop computer, laptop computer, workstation, or other computing device that is configured to be used by a supervisory user. Subordinate user computing device 195 may be a desktop computer, laptop computer, workstation, or other computing device that is configured to be used by a subordinate user. In some arrangements, the supervisory user may be a parent and the subordinate user may be a teen or other minor supervised by the parent. For instance, the user of supervisory user computing device 190 may utilize supervisory user computing device 190 to define one or more rules (e.g., such as spending limits, transaction approval conditions, and/or the like) for the user of subordinate user computing device 195. In addition, as the user of subordinate user computing device 195 utilizes subordinate user computing device 195 and/or one or more other systems and/or devices to request transactions, event control computing platform 110 and/or event validation computing platform 120 may selectively authorize such transactions based on rules received from supervisory user computing device 190 and/or defined by the user of supervisory user computing device 190 and/or based on other factors and/or rules.

Computing environment 100 also may include one or more networks, which may interconnect one or more of event control computing platform 110, event validation computing platform 120, administrative computing device 130, social media service computing platform 160, social media service computing platform 170, data feed aggregation server 180, supervisory user computing device 190, and subordinate user computing device 195. For example, computing environment 100 may include private network 140, which may be owned and/or operated by a specific organization and/or which may interconnect one or more systems and/or other devices associated with the specific organization. For example, event control computing platform 110, event validation computing platform 120, and administrative computing device 130 may be owned and/or operated by a specific organization, such as a financial institution, and private network 140 may interconnect event control computing platform 110, event validation computing platform 120, administrative computing device 130, and one or more other systems and/or devices associated with the organization. Additionally, private network 140 may connect (e.g., via one or more firewalls) to one or more external networks not associated with the organization, such as public network 150. Public network 150 may, for instance, include the internet and may connect various systems and/or devices not associated with the organization operating private network 140. For example, public network 150 may interconnect social media service computing platform 160, social media service computing platform 170, data feed aggregation server 180, supervisory user computing device 190, subordinate user computing device 195, and/or various other systems and/or devices.

In some arrangements, the computing devices that make up and/or are included in event control computing platform 110, event validation computing platform 120, administrative computing device 130, social media service computing platform 160, social media service computing platform 170, data feed aggregation server 180, supervisory user computing device 190, and subordinate user computing device 195 may be any type of computing device capable of receiving a user interface, receiving input via the user interface, and communicating the received input to one or more other computing devices. For example, the computing devices that make up and/or are included in event control computing platform 110, event validation computing platform 120, administrative computing device 130, social media service computing platform 160, social media service computing platform 170, data feed aggregation server 180, supervisory user computing device 190, and subordinate user computing device 195 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of the computing devices that make up and/or are included in event control computing platform 110, event validation computing platform 120, administrative computing device 130, social media service computing platform 160, social media service computing platform 170, data feed aggregation server 180, supervisory user computing device 190, and subordinate user computing device 195 may, in some instances, be special-purpose computing devices configured to perform specific functions.

Referring to FIG. 1B, event control computing platform 110 may include one or more processor(s) 111, memory(s) 112, and communication interface(s) 113. A data bus may interconnect processor(s) 111, memory(s) 112, and communication interface(s) 113. Communication interface(s) 113 may be one or more network interfaces configured to support communications between event control computing platform 110 and one or more networks (e.g., private network 140, public network 150). For example, event control computing platform 110 may establish one or more connections and/or communication links to one or more other systems and/or devices (e.g., event validation computing platform 120, administrative computing device 130, social media service computing platform 160, social media service computing platform 170, data feed aggregation server 180, supervisory user computing device 190, and subordinate user computing device 195) via communication interface(s) 113, and event control computing platform 110 may exchange data with the one or more other systems and/or devices (e.g., event validation computing platform 120, administrative computing device 130, social media service computing platform 160, social media service computing platform 170, data feed aggregation server 180, supervisory user computing device 190, and subordinate user computing device 195) via communication interface(s) 113 while the one or more connections and/or communication links are established. Memory(s) 112 may include one or more program modules having instructions that when executed by processor(s) 111 cause event control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of event control computing platform 110 and/or by different computing devices that may form and/or otherwise make up event control computing platform 110.

For example, memory(s) 112*b* may have, store, and/or include an event control module 112*a*, an event control database 112*b*, a connection management module 112*c*, and a machine learning engine 112*d*. Event control module 112*a* may have, store, and/or include instructions that direct and/or cause event control computing platform 110 to orchestrate event validation operations and event control operations across multiple computer systems and devices in computing environment 100 and perform other associated functions, as discussed in greater detail below. Event control database 112*b* may store information used by event control computing platform 110 in orchestrating event validation operations and event control operations across multiple computer systems and devices in computing environment 100 and in performing other associated functions. Connection management module 112*c* may have, store, and/or include instructions that direct and/or cause event control computing platform 110 to establish one or more connections and/or communication links to one or more other systems and/or devices (e.g., event validation computing platform 120, administrative computing device 130, social media service computing platform 160, social media service computing platform 170, data feed aggregation server 180, supervisory user computing device 190, and subordinate user computing device 195) via communication interface(s) 113 and/or to manage and/or otherwise control the exchanging of data with the one or more other systems and/or devices (e.g., event validation computing platform 120, administrative computing device 130, social media service computing platform 160, social media service computing platform 170, data feed aggregation server 180, supervisory user computing device 190, and subordinate user computing device 195) via communication interface(s) 113 while the one or more connections and/or communication links are established. Machine learning engine 112*d* may have, store, and/or include instructions that direct and/or cause event control computing platform 110 to dynamically analyze data collected by event control computing platform 110 based on historical data sets and/or present operations and automatically optimize the functions provided by event control computing platform 110 based on analyzing such data.

Figure 2A:
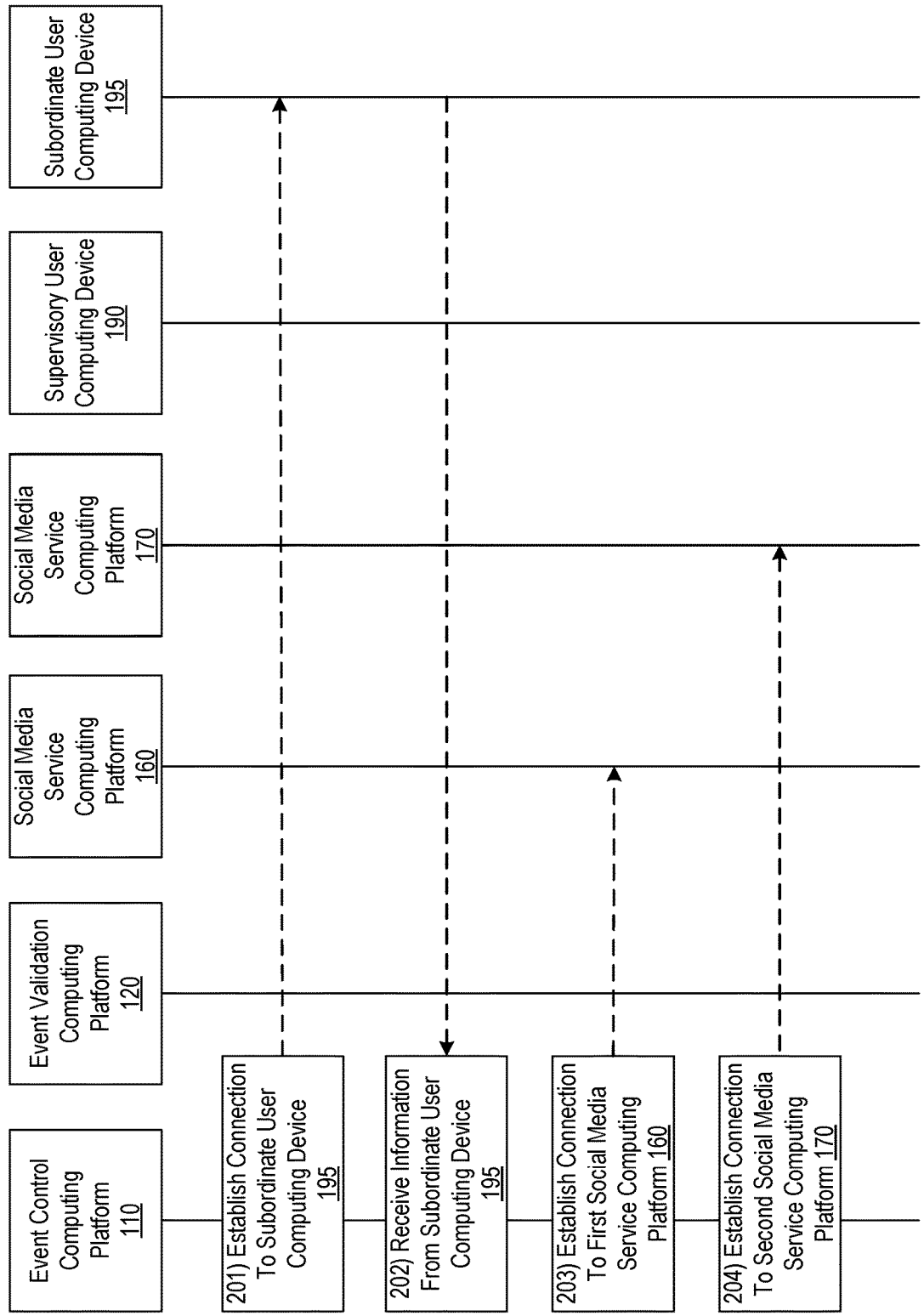
FIGS. 2A-2D depict an illustrative event sequence for multicomputer processing of user data with centralized event control in accordance with one or more example embodiments.
Figure 2B:
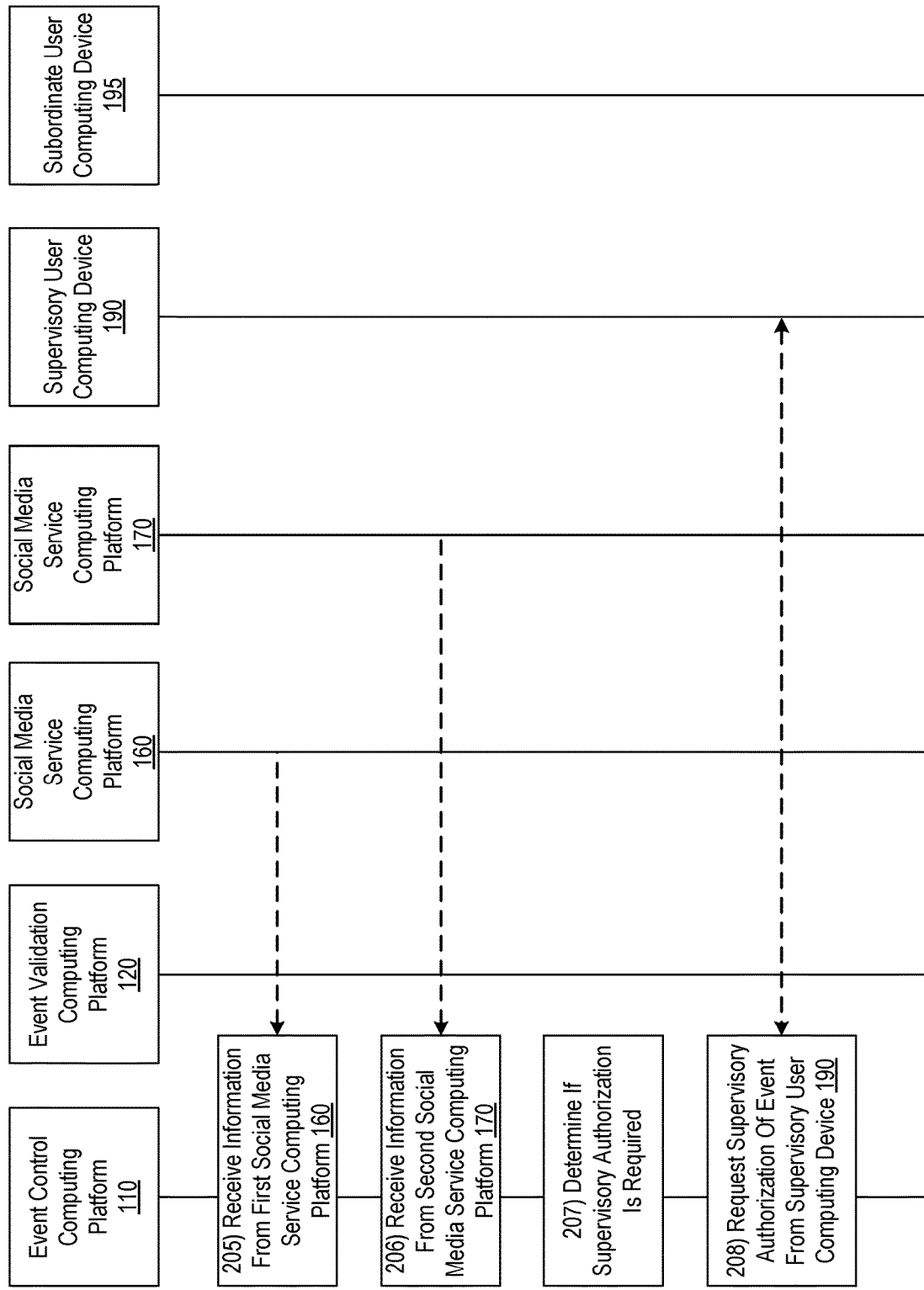

FIGS. 2A-2D depict an illustrative event sequence for multicomputer processing of user data with centralized event control in accordance with one or more example embodiments. Referring to FIG. 2A, at step 201, event control computing platform 110 may establish, via communication interface 113, a first connection to subordinate user computing device 195. Once event control computing platform 110 has established a connection to subordinate user computing device 195, event control computing platform 110 may receive a request to authorize an event from the subordinate user computing device 195 in step 202. An event may correspond to a specific transaction, such as a purchase of a particular item or items. The information included in the request received from subordinate user computing device 195 may include, for example, a description of an item or items that are desired to be purchased, an identification of the vendor or store from which the item or items are intended to be purchased, the total amount requested to purchase the item or items, and optionally a message from the subordinate user explaining the purpose for the transaction.

At step 203, event control computing platform 110 may establish, via communication interface 113, a first connection to a first social media service computing platform 160 and in step 204, event control computing platform 110 may establish, via communication interface 113, a second connection to a second social media service computing platform 170. In some instances, event control computing platform 110 may establish connections to any number of social media service computing platforms. In some aspects, a data feed aggregation server 180 may aggregate all of the information from social media service computing platforms 160, 170 and other sources prior to processing that information. In one example, event control computing platform 110 may be operated by a financial institution such as a bank.

Social media service computing platforms 160, 170 may provide one or more social media feeds with information related to one or more users. A user may register with social media service computing platforms 160, 170 and social media service computing platforms 160, 170 may generate a user account and associated user credentials for logging into the user account. When the user enters valid user credentials, social media service computing platforms 160, 170 may provide the user with access to one or more services hosted by social media service computing platforms 160, 170. For example, the services hosted by social media service computing platforms 160, 170 may enable the user to receive and transmit messages to other users, upload pictures, share content of interest, and provide location information to generate a personalized social media feed associated with the user. The services hosted by social media service computing platforms 160, 170 also may enable the user to control who has access to the information in his or her personalized social media feed. For example, the user may limit access to user devices associated with friends, close acquaintances, or family members. In some examples, the user may also allow access to user devices associated with users that do not have an account on social media service computing platforms 160, 170.

Event control computing platform 110 (and/or associated devices such as administrative computing device 130) may also have access to a given user's social media feed on social media service computing platforms 160, 170 through private network 140 and public network 150. This access may be provided by the user associated with a given user account or someone who supervises the user associated with the user account (e.g., parent, guardian, or the like). Thus, once event control computing platform 110 has established connections to social media service computing platforms 160, 170, event control computing platform 110 may receive social media information from the first social media service computing platform 160 in step 205 in FIG. 2B and from the second social media service computing platform 170 in step 206. In addition, event control computing platform 110 may also establish connections to supervisory and subordinate user computing devices 190, 195 and receive additional information from these devices via the established connections. Further still, event control computing platform 110 may receive additional information (e.g., information about financial transactions made by a given user, or the like) from additional sources (e.g., financial accounts) accessible to platform 110. Event control computing platform 110 may be specially configured to include decryption capabilities to allow the information to be transmitted safely and securely.

In some aspects, event control computing platform 110 may receive information from social media service computing platforms 160, 170 in real time as data is posted to social media service computing platforms 160, 170. In one example, in receiving information in real time, the information may be received by platform 110 within two minutes of being posted to social media service computing platforms 160, 170.

Once event control computing platform 110 receives social media information from social media computing platforms 160, 170, platform 110 may begin to determine, based on this information and other rules and conditions, whether the transaction request from subordinate user computing device 195 should be authorized. Event control computing platform 110 may apply rules to the information received from subordinate user computing device 195 such as user-specific transaction rules, account-specific transaction rules, user-specific trends information, user-segment trends information, and/or other conditions. These rules may be grouped and arranged into sets of related rules, or rulesets. Rulesets may be ordered by the order in which they are to be applied to a transaction request. At a first threshold, control computing platform 110 may determine if the transaction is black-listed, or always denied. This category of transactions may be rejected by control computing platform 110 and the process may stop. In an example, control computing platform 110 may also verify some aspect of the information received from subordinate user computing device 195 against social media information from social media computing platforms 160, 170. For example, if the social media information indicates the subordinate user computing device 195 is located at a first location but the information received from subordinate user computing device 195 indicates a request for a transaction at a second location, the request may be denied at this step and the process may stop.

In step 207, event control computing platform 110 may determine that the transaction requires supervisory authorization. In some examples, event control computing platform 110 may transmit, in step 208, a request for supervisory authorization to a supervisory user computing device 190 of a supervisory user associated with the subordinate user in question. In an example, the supervisory user of supervisory user computing device 190 may be a parent or guardian of a subordinate user (e.g., a teen) and the authorization may indicate a transaction may be processed. The supervisory user of supervisory user computing device 190 may choose to authorize or reject the transaction based on the supervisory user's knowledge of the teen's need, and supervisory user computing device 190 accordingly may transmit authorization information or rejection information to event control computing platform 110 based on input received from the supervisory user of supervisory user computing device 190. If the supervisory user decides to reject authorization of the event and event control computing platform 110 receives information indicating that the supervisory user rejected the authorization, then the process may stop and event control computing platform 110 may not authorize the event.

Figure 3:
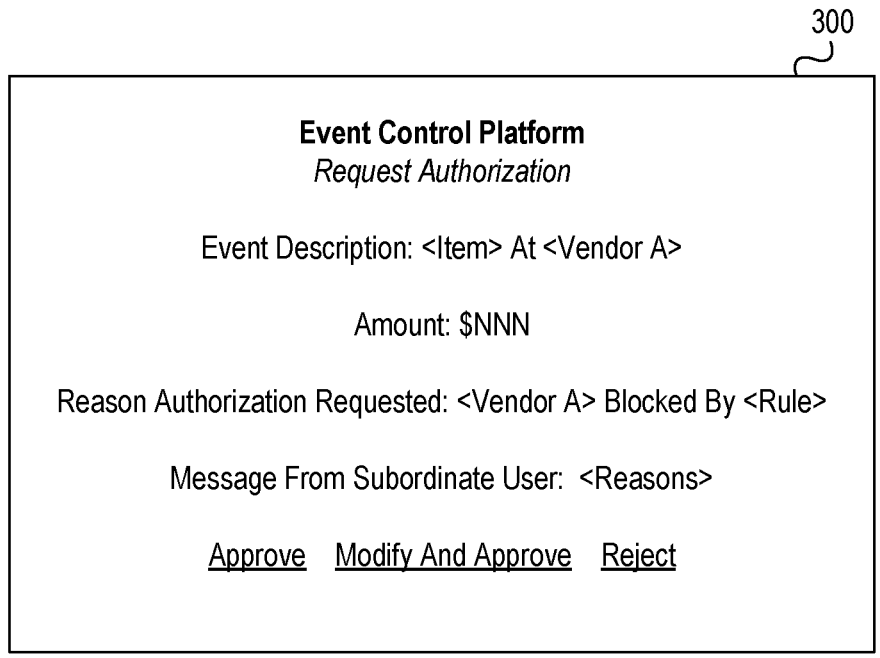
FIG. 3 depicts an example graphical user interface to obtain supervisory authorization for an event in accordance with one or more example embodiments.

To obtain supervisory authorization for a transaction, event control computing platform 110 may cause supervisory user computing device 190 to display and/or otherwise present a graphical user interface similar to graphical user interface 300, which is illustrated in FIG. 3. As shown in FIG. 3, graphical user interface 300 may include information related to the transaction. For example, interface 300 may include information about the transaction, the rule that prompted the authorization request, and any message from the subordinate user computing device 195 about the transaction. This information may assist the operated of supervisory user computing device 190 in making a decision to approve or reject the authorization request. In the example shown in FIG. 3, a subordinate user computing device 195 may be requesting a transaction to purchase an item that was blocked by a vendor-based rule. Interface 300 may also include a message from the subordinate user computing device 195 stating a reason that the transaction is requested. In this example, event control computing platform 110 may monitor social media activity and filter and/or combine large volumes of information to produce information that is timely, relevant, financially actionable, and specific to an individual.

In step 208, supervisory user computing device 190 associated with a supervisory user may authorize an event. In some examples, the supervisory user may use supervisory user computing device 190 to send a text message, email, voicemail, or any other type of message to event control computing platform 110 to indicate whether she authorizes the transaction. In other examples, event control computing platform 110 might not need to transmit the request for authorization in step 208 because the supervisory user may have already provided authorization or may have instructed event control computing platform 110 that prior authorization is not necessary.

Figure 4:
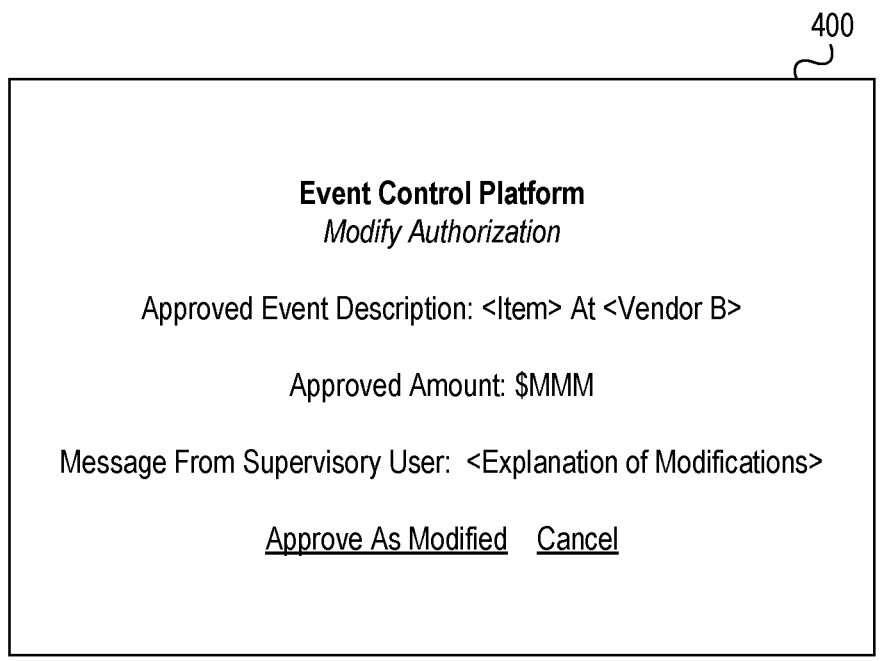
FIG. 4 depicts an example graphical user interface to modify supervisory authorization for an event in accordance with one or more example embodiments.

The supervisory authorization received in step 208 may include instructions to modify the transaction request prior to approval. As shown in FIG. 3, graphical user interface 300 of supervisory user computing device 190 may include an option for the supervisory user to modify the transaction and send approval for the modified transaction. FIG. 4 depicts an example graphical user interface 400 to modify supervisory authorization for a transaction in accordance with one or more example embodiments. Interface 400 may include an interface for accepting modifications to, for example, the item, the vendor, and the transaction amount. For example, if a subordinate user computing device 195 requests authorization for an $80 transaction, the operator of supervisory user computing device 190 may authorize only $50. In an example, the supervisory user may authorize the same amount to be spent, but only at an alternate vendor. In this example, the modified authorization may indicate a reason associate with the modifications made by the operator of supervisory user computing device 190.

Graphical user interface 400 may include a modification option for the operator of supervisory user computing device 190 approve the transaction as a loan. If a transaction is approved as a loan, the event control computing platform 110 may record information about the transaction in a database to facilitate repayment over time. The event control computing platform 110 may provide for loan parameters to be set by the operator of supervisory user computing device 190. Example of loan parameters may include, but are not limited to, interest rate, loan term, payment schedules, and other such parameters. Event control computing platform 110 may suggest loan parameters to the operator of supervisory user computing device 190 based on, among other things, loan parameter templates, market interest rate information, and/or financial history information. For example, financial history information may be information related to the past repayment of similar loans, repayment history of other loans, other financial accounts, and/or other such history related to financial actions. Financial history information may be received by event control computing platform 110 from other systems via private network 140 and/or public network 150.

Figure 2C:
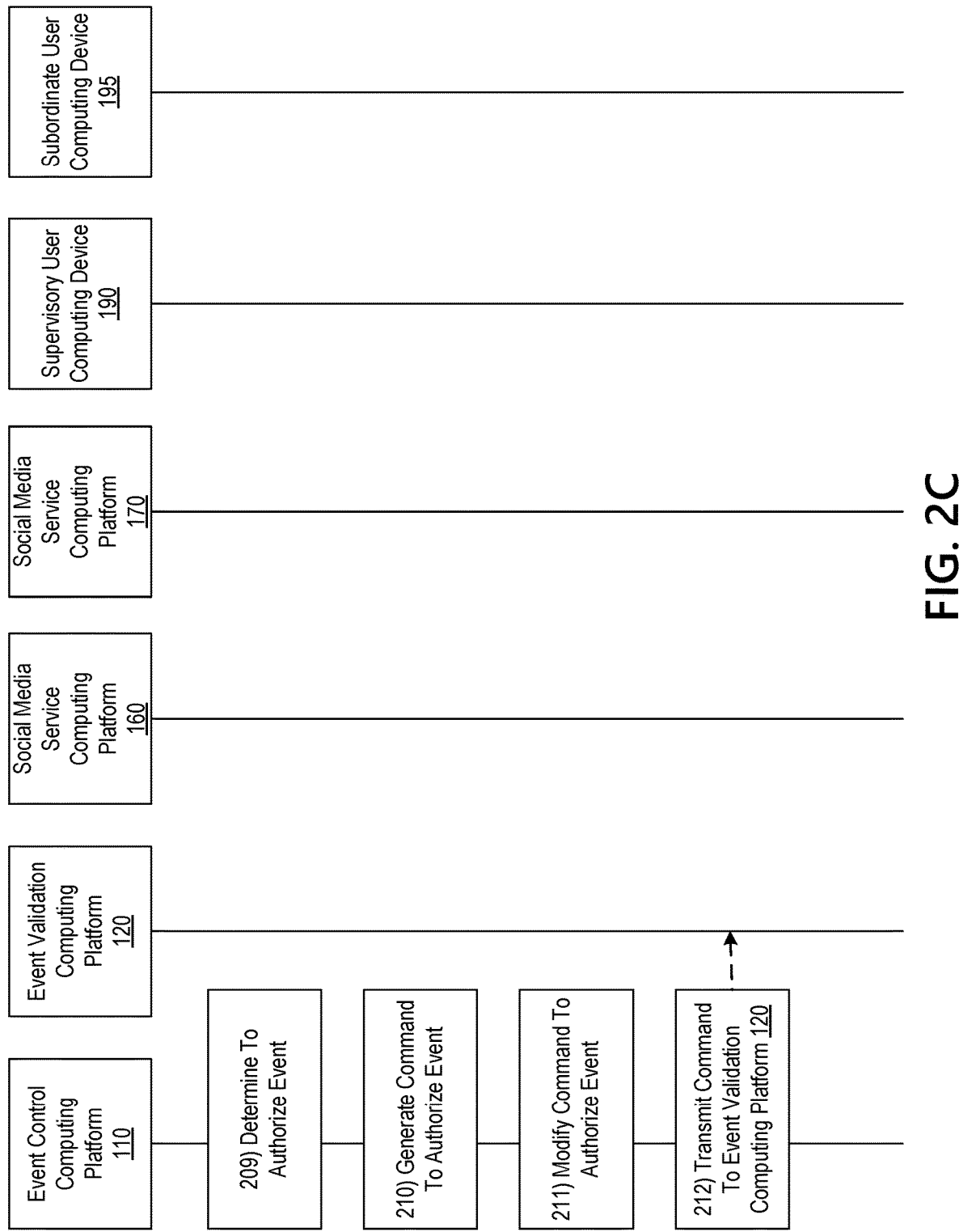
Figure 2D:
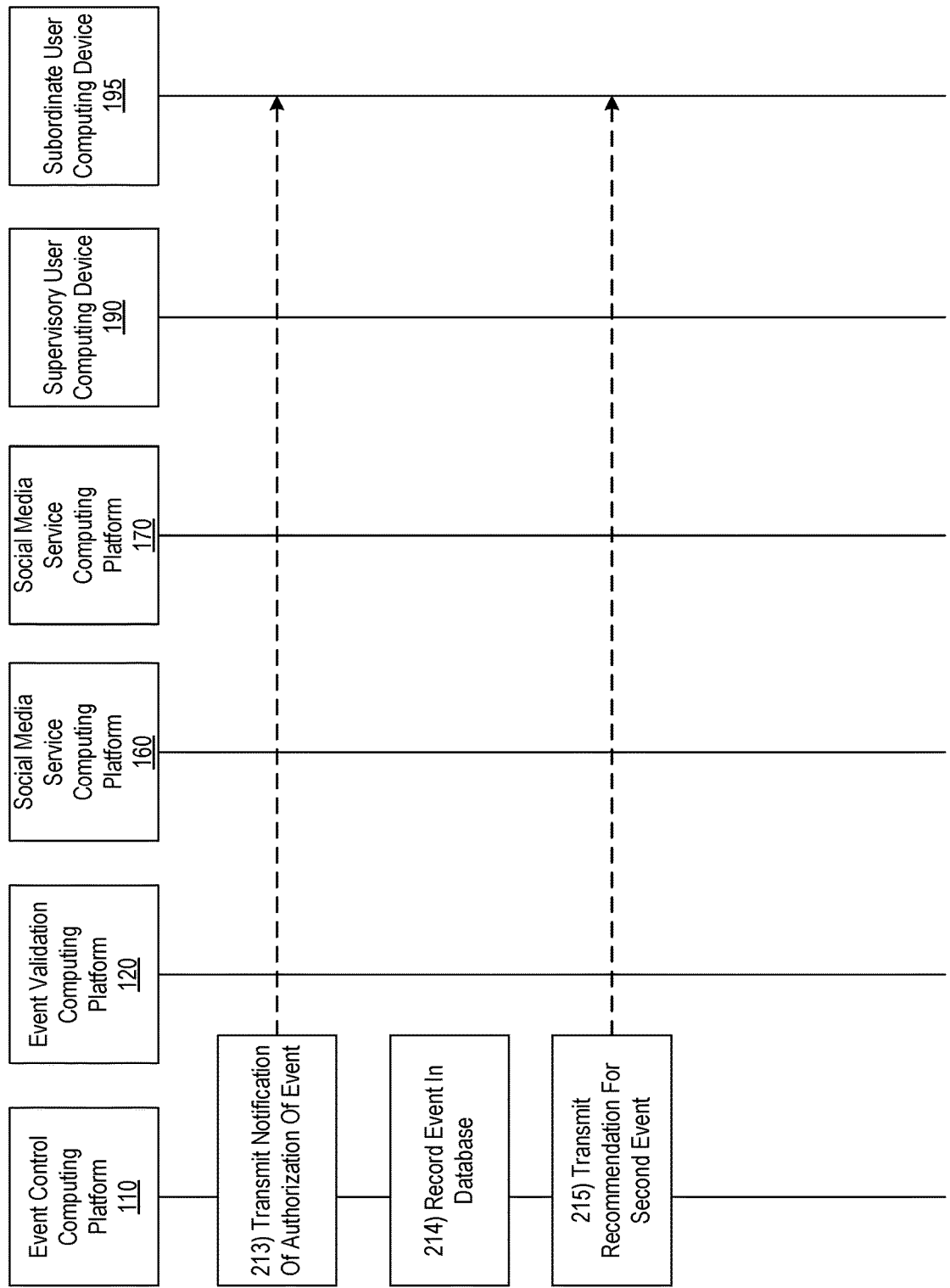

Referring to FIG. 2C, in step 209, event control computing platform 110 may then determine to authorize the event. This determination may be based on the request, social media activity, any applicable rulesets in event control computing platform 110, and any supervisory authorization received in step 208. At step 209, event control computing platform 110 may execute the same or similar rules as applied in step 207. The determination at step 209 to authorize the event may be a result of the request passing or satisfying all applicable rules or conditions applied by event control computing platform 110. Examples of rules or conditions include, but are not limited to, spending limits, vendor white-lists, vendor black-lists, time constraints (e.g., transactions during curfew hours may be denied), or rules related to the specific item or items that are part of the requested transaction.

In step 210, event control computing platform 110 may then generate a command to effect the authorization of the event. The command may direct a computing platform such as event validation computing platform 120 to authorize the event. The command may comprise a one-time use authorization token specific to the authorized event. For example, the command may specify a vendor, an amount, and a time limit during which it is valid. The command may deny transactions outside of these parameters. For example, if the command specifies a particular department store that is authorized for the transaction, the subordinate user may not then use that authorization for a transaction at a different luxury goods retailer.

The command generated by event control computing platform 110 at step 210 may specify an amount for which the transaction is authorized. For example, if the transaction is authorized for $200, the authorization may not be used to purchase a $300 item. Similarly, the command may specify a particular item for which the authorization is valid. For example, an item may be identified by a stock keeping unit (SKU) and the authorization may not be valid for a transaction involving any other SKU. Similarly, the command may specify a duration of time for which the transaction is authorized. For example, the transaction may be authorized for 24 hours, after the expiration of which a new authorization may be required.

If event control computing platform 110 received a modified supervisory authorization from supervisory user computing device 190 in step 208, the control computing platform 110 may then, at step 211, modify the command according to instructions provided in the modified supervisory authorization prior to transmitting the command. If no modified supervisory authorization was received in step 208, step 211 may be bypassed and the command may be unmodified.

Once a command has been generated in step 210 and any applicable modifications made in step 211, event control computing platform 110 may then transmit the command to event validation computing platform 120 in step 212. Event validation computing platform 120 may then process the command to authorize transactions specified by the received command. Event validation computing platform 120 may interface with a transaction processing system to effect authorization of the event.

Authorized events may be facilitated by a compatible payment or transaction method. For example, a one-time use virtual payment card number may be provided to the subordinate user associated with subordinate user computing device 195 that is valid for only the authorized event. Any attempted transaction involving the one-time use virtual payment card number outside of the parameters specified in the authorization may be declined by a payment processor. In an example, any payment method may be used but be subject to dynamic authorization by a payment processor in accordance with the authorization. In some embodiments, an electronic wallet associated with subordinate user computing device 195 may be provided with a transaction authorization token to facilitate the transaction. For example, an electronic wallet associated with subordinate user computing device 195 may include contactless payment technologies to facilitate transactions. Vendor point-of-sale (POS) systems may be integrated with event control computing platform 110 to enforce SKU-level authorizations. For example, a vendor POS system may identify a transaction subject to event control computing platform 110 and request authorization from event control computing platform 110 prior to performing the transaction.

In some examples, a successful transaction indicates to a subordinate user computing device 195 and its operator that the transaction was authorized by event control computing platform 110. In some examples, in step 213 in FIG. 2D, event control computing platform 110 may transmit a notification of the authorization and any supervisory modifications to subordinate user computing device 195.

If event control computing platform 110 received an indication in step 208 that the transaction is authorized as a loan, event control computing platform 110 may record the transaction event in a database entry as a loan at step 214. The transaction event and any associated loan parameters may be recorded at step 214. This database may be by used by the event control computing platform 110 for tracking repayment of the loan according to parameters set by the supervisory user computing device 190.

Finally, at step 215, event control computing platform 110 may optionally transmit a recommendation for a second event based on, any one or a combination of the requested transaction, the modifications made by the supervisory user computing device 190, and/or information from social media service computing platforms 160, 170 and other sources about many different individuals. For example, if the supervisory user computing device 190 modified the amount authorized for the transaction, event control computing platform 110 may recommend a different item or a different vendor from which to make a comparable purchase that is compliant with the authorized amount. In an example, if an authorization is modified to decrease the amount authorized, the event control computing platform 110 may recommend a different vendor that is having a sale on a similar item that may be comparable. In an example, event control computing platform 110 may provide additional information in the recommendation to assist in finding transaction which may comply with a modified authorization. Event control computing platform 110 may interface with an external service or data source to obtain recommendations for transactions. In some embodiments, the external service or data source may be provided by a third party. Transaction recommendations may be received by event control computing platform 110 from other systems via private network 140 and/or public network 150.

In some aspects, event control computing platform 110 may reprogram functionality of platform 110, using machine learning engine 112*d*, to alter a condition or rule under which a request may be authorized. For example, platform 110 may alter a condition or rule based on financial history information associated with a subordinate user, financial history information associated with a supervisory user, history of past authorizations facilitated by event control computing platform 110, social media information of a number of individuals about which event control computing platform 110 receives information, or other similar information. In an example, platform 110 may increase a spending limit rule based on financial history information associated with a subordinate user in successfully repaying loans. An example of using financial transaction history associated with a supervisory user may include altering an authorization rule based on the available balance or credit limit of a bank account or other financial account that may be used to fund transactions. For example, amounts up to 10% of an available balance may be automatically allowed, amounts greater than 90% of the available balance may be automatically denied, and amounts in between may be required to be authorized by the system.

Event control computing platform 110 may alter a rule based on past authorizations received from supervisory user computing device 190. The past authorizations may involve subordinate user computing device 195, or a different subordinate user computing device. For example, if a supervisory user computing device 190 has a history of authorizing transactions with a common characteristic, platform 110 may learn to automatically authorize such transactions identified as being similar to those previously authorized. In this way, platform 100 may learn the preferences and habits of the operator of supervisory user computing device 190 so as to not transmit numerous similar requests. The preferences and habits of a supervisory user may also be learned from interactions with other subordinate user computing devices. For example, if a parent routinely authorizes transactions at a certain retailer for a first subordinate user computing device, the control computing platform 110 may alter a rule for a second subordinate user computing device. These and other machine learning examples may decrease the need for manual configuration of rules for the system.

Event control computing platform 110 may alter a condition or rule based on social media information of a number of other individuals about which event control computing platform 110 receives information. For example, event control computing platform 110 may identify, based on the received information, which other subordinate users have characteristics similar (e.g., similar age, location, school, hobbies) to the subordinate user in question. Then, event control computing platform 110 may determine similarities in authorizations associated with those other subordinate users and alter a condition or rule for the subordinate user. For example, event control computing platform 110 may identify a trend of students at a particular school purchasing prom dresses in a short time-span. The event control computing platform 110 may further identify a median price of the prom dresses purchased by students at the school and alter a rule to authorize prom dress purchases around or below the median price, but require authorization for prom dress purchases significantly above the median price.

With all such reprogramming functionality of event control computing platform 110 using machine learning engine 112d, the platform 110 may develop learned rules but require action from supervisory user computing device 190 to start enforcing the learned rules. For example, learned rules may be provided as a suggestion or recommendation to the supervisory user computing device 190 and require approval to be implemented. In some examples, event control computing platform 110 may automatically implement learned rules. Further, event control computing platform 110 may determine a confidence score for new learned rules and transmit the confidence score to the supervisory user computing device 190 in conjunction with the suggested learned rule. The confidence score may reflect, for example, the likelihood that the operator of the supervisory user computing device 190 will implement the proposed rule. Confidence scores may be used by the event control computing platform 110 to determine which learned rules to transmit to the supervisory user computing device 190, or used to sort suggested rules presented by supervisory user computing device 190.

Confidence scores may reflect of the past behavior of the supervisory user computing device 190, and/or the past behavior of other supervisory user computing devices. For example, if an operator of supervisory user computing device 190 frequently dismisses suggested learned rules to increase spending limits, event control computing platform 110 may assign a lower confidence score to suggested learned rules that increase spending limits. Similarly, if the operator of supervisory user computing device 190 in this example frequently implements suggested learned rules to decrease spending limits, event control computing platform 110 may assign a higher confidence score to suggested learned rules that decrease spending limits. Likewise, the observed behavior of other supervisory user computing devices may be used by event control computing platform 110 to adjust confidence scores. For example, if a proposed learned rule is suggested to a large number of supervisory user computing devices and many users of those devices choose to implement the proposed learned rule, the confidence score of the rule may be increased. In the prom dress example, the learned rule limiting prom dress expenditures may be popular with a particular community, and as such may be associated with a high confidence score for supervisory user computing devices within that community.

Figure 5:
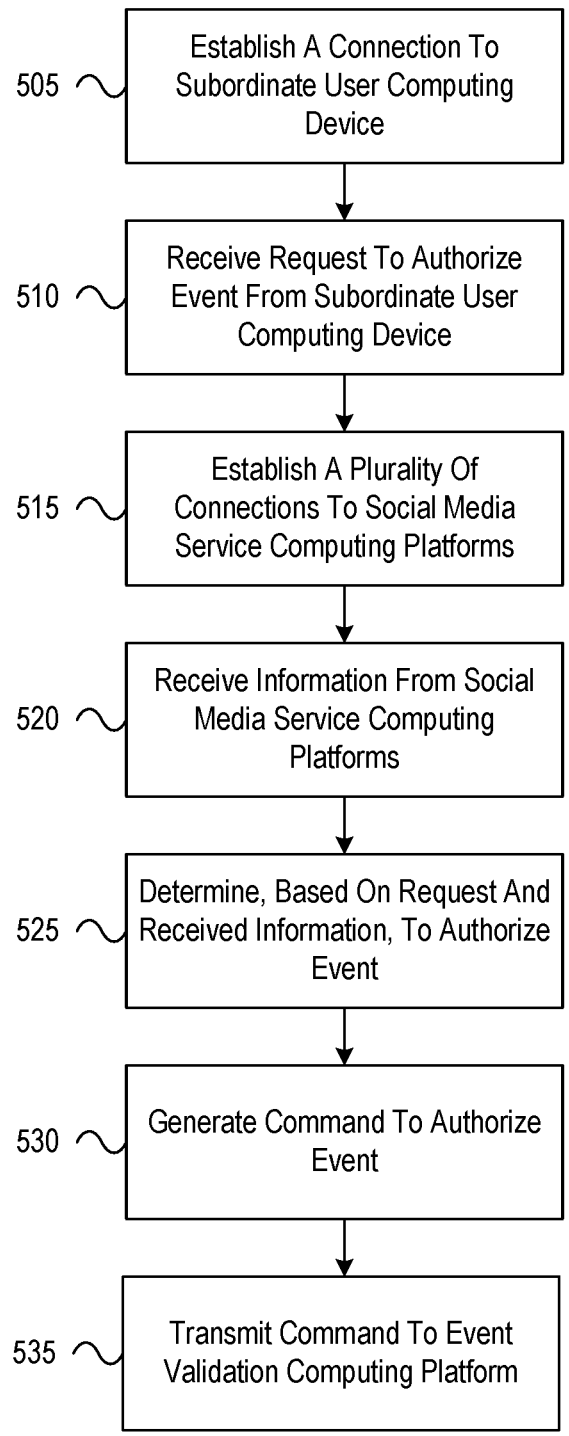
FIG. 5 depicts an illustrative method for multicomputer processing of user data with centralized event control in accordance with one or more example embodiments.

FIG. 5 depicts an illustrative method for multicomputer processing of user data with centralized event control in accordance with one or more example embodiments. Referring to FIG. 5, at step 505, a computing platform having at least one processor, a memory, and a communication interface may establish, via the communication interface, a first connection to a subordinate user computing device. Subsequently, at step 510, the computing platform may receive a request to authorize an event from the subordinate user computing device. Then, at step 515, the computing platform may establish a plurality of connections to a plurality of social media service computing platforms, and at step 520, the computing platform may receive first information from at least one of the plurality of social media service computing platforms. At step 525, the computing platform may determine, based on the request and the first information, to authorize the request, and at step 530, the computing platform may then generate a command configured to authorize the event. Finally, in step 535, the computing platform may transmit, via the communication interface, the command to an event validation computing platform.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   establish, via the communication interface, a first connection to a subordinate user computing device;
   while the first connection is established, receive, via the communication interface, from the subordinate user computing device, a request to authorize an event;
   establish, via the communication interface, a second plurality of connections to a plurality of social media service computing platforms;
   while the second plurality of connections is established, receive first information from at least one of the plurality of social media service computing platforms;
   determine, based on a comparison of the request to authorize the event with the first information received from the at least one of the plurality of social media service computing platforms, to authorize the request;
   in response to determining to authorize the request, generate a command directing an event validation computing platform to authorize the event;
   transmit, via the communication interface, to the event validation computing platform, the command directing the event validation computing platform to authorize the event, wherein transmitting the command directing the event validation computing platform to authorize the event causes the event validation computing platform to execute one or more actions enabling the subordinate user computing device to initiate the event; and
   transmit, via the communication interface, to the subordinate user computing device, a notification that the computing platform has transmitted a command directing the event validation computing platform to authorize the event, wherein the notification comprises an identification of the event and at least one piece of information from the command directing the event validation computing platform to authorize the event.

2. The computing platform of claim 1, wherein the memory stores additional computer-readable instructions that, when executed by the at least one processor, cause the computing platform to:
   transmit, prior to transmitting the command, to a supervisory user computing device associated with a supervisory user, a request for supervisory authorization of the event.

3. The computing platform of claim 2, wherein the memory stores additional computer-readable instructions that, when executed by the at least one processor, cause the computing platform to:
   receive, from the supervisory user computing device associated with a supervisory user, a command instructing the computing platform to authorize the event; and
   compare the request for supervisory authorization of the event with the command received from the supervisory user computing device instructing the computing platform to authorize the event.

4. The computing platform of claim 3, wherein the memory stores additional computer-readable instructions that, when executed by the at least one processor, cause the computing platform to:
   responsive to identifying, based on the comparing, at least one difference between the request for supervisory authorization of the event and the command received from the supervisory user computing device instructing the computing platform to authorize the event, modifying, based on the at least one difference, the command directing the event validation computing platform to authorize the event.

5. The computing platform of claim 1, wherein the memory stores additional computer-readable instructions that, when executed by the at least one processor, cause the computing platform to:
   establish, via the communication interface, a third connection to the event validation computing platform;
   while the third connection is established, receive, via the communication interface, from the event validation computing platform, a plurality of authorization rules;
   compare the request to authorize the event to each of the plurality of authorization rules; and
   prior to determining to authorize the request, determine that the request to authorize the event satisfies each of the plurality of authorization rules.

6. The computing platform of claim 5, wherein the memory stores additional computer-readable instructions that, when executed by the at least one processor, cause the computing platform to:
   reprogram functionality of the computing platform, using a machine learning engine, to alter at least one of the plurality of authorization rules based on additional information received from the plurality of social media service computing platforms.

7. The computing platform of claim 1, wherein the memory stores additional computer-readable instructions that, when executed by the at least one processor, cause the computing platform to:
   identify a first characteristic of the first information;
   identify a second characteristic of the request to authorize the event, wherein the second characteristic is related to the first characteristic;
   compare the first characteristic of the first information with the second characteristic of the request to authorize the event; and
   verify, based on the comparing of the first characteristic of the first information with the second characteristic of the request to authorize the event, and prior to determining to authorize the request, that the first characteristic of the first information verifies at least one characteristic of the request to authorize the event is accurate.

8. The computing platform of claim 1, wherein the command directing the event validation computing platform to authorize the event comprises a one-time use authorization token corresponding to the event, and wherein transmitting the command directing the event validation computing platform to authorize the event further causes the event validation computing platform to execute one or more actions enabling the subordinate user computing device to initiate the event exactly once.

9. The computing platform of claim 1, wherein the memory stores additional computer-readable instructions that, when executed by the at least one processor, cause the computing platform to:
   record, in a database, an entry corresponding to the event, wherein the entry includes information associated with the command directing the event validation computing platform to authorize the event.

10. The computing platform of claim 1, wherein the memory stores additional computer-readable instructions that, when executed by the at least one processor, cause the computing platform to:
   compare the request to authorize the event with the command directing the event validation computing platform to authorize the event;
   determine, based on the comparing of the request to authorize the event with the command directing the event validation computing platform to authorize the event, a second event; and
   transmit, to the subordinate user computing device, a recommendation for the second event.

11. A method, comprising:
at a computing platform comprising at least one processor, memory, and a communication interface:
   establishing, via the communication interface, a first connection to a subordinate user computing device;
   while the first connection is established, receiving, via the communication interface, from the subordinate user computing device, a request to authorize an event;
   establishing, via the communication interface, a second plurality of connections to a plurality of social media service computing platforms;
   while the second plurality of connections is established, receiving first information from at least one of the plurality of social media service computing platforms;
   determining, based on a comparison of the request to authorize the event with the first information received from the at least one of the plurality of social media service computing platforms, to authorize the request;
   in response to determining to authorize the request, generating a command directing an event validation computing platform to authorize the event;
   transmitting, via the communication interface, to the event validation computing platform, the command directing the event validation computing platform to authorize the event, wherein transmitting the command directing the event validation computing platform to authorize the event causes the event validation computing platform to execute one or more actions enabling the subordinate user computing device to initiate the event; and
   transmitting, via the communication interface, to the subordinate user computing device, a notification that the computing platform has transmitted a command directing the event validation computing platform to authorize the event, wherein the notification comprises an identification of the event and at least one piece of information from the command directing the event validation computing platform to authorize the event.

12. The method of claim 11, further comprising: transmitting, prior to transmitting the command, to a supervisory user computing device associated with a supervisory user, a request for supervisory authorization of the event.

13. The method of claim 12, further comprising:
   receiving, from the supervisory user computing device associated with a supervisory user, a supervisory authorization for the event; and
   receiving, from the supervisory user computing device associated with a supervisory user, a command instructing the computing platform to authorize the event; and
   comparing the request for supervisory authorization of the event with the command received from the supervisory user computing device instructing the computing platform to authorize the event.

14. The method of claim 13, further including:
   responsive to identifying, based on the comparing, at least one difference between the request for supervisory authorization of the event and the command received from the supervisory user computing device instructing the computing platform to authorize the event, modifying, based on the at least one difference, the command directing the event validation computing platform to authorize the event.

15. The method of claim 11, further comprising:
establishing, via the communication interface, a third connection to the event validation computing platform;
while the third connection is established, receiving, via the communication interface, from the event validation computing platform, a plurality of authorization rules;
comparing the request to authorize the event to each of the plurality of authorization rules; and
prior to determining to authorize the request, determining that the request to authorize the event satisfies each of the plurality of authorization rules.

16. The method of claim 15, further comprising: reprogramming functionality of the computing platform, using a machine learning engine, to alter at least one of the plurality of authorization rules based on additional information received from the plurality of social media service computing platforms.

17. The method of claim 11, wherein the command directing the event validation computing platform to authorize the event comprises a one-time use authorization token corresponding to the event, and wherein transmitting the command directing the event validation computing platform to authorize the event further causes the event validation computing platform to execute one or more actions enabling the subordinate user computing device to initiate the event exactly once.

18. The method of claim 11, further comprising: recording, in a database, an entry corresponding to the event, wherein the entry includes information associated with the command directing the event validation computing platform to authorize the event.

19. The method of claim 11, further comprising:
comparing the request to authorize the event with the command directing the event validation computing platform to authorize the event;
determining, based on the comparing of the request to authorize the event with the command directing the event validation computing platform to authorize the event, a second event; and
transmitting, to the subordinate user computing device, a recommendation for the second event.

20. One or more non-transitory computer-readable media storing instructions that, when executed by a computing platform comprising at least one processor, memory, and a communication interface, cause the computing platform to:
establish, via the communication interface, a first connection to a subordinate user computing device;
while the first connection is established, receive, via the communication interface, from the subordinate user computing device, a request to authorize an event;
establish, via the communication interface, a second plurality of connections to a plurality of social media service computing platforms;
while the second plurality of connections is established, receive first information from at least one of the plurality of social media service computing platforms;
determine, based on a comparison of the request to authorize the event with the first information received from the at least one of the plurality of social media service computing platforms, to authorize the request;
in response to determining to authorize the request, generate a command directing an event validation computing platform to authorize the event;
transmit, via the communication interface, to the event validation computing platform, the command directing the event validation computing platform to authorize the event, wherein transmitting the command directing the event validation computing platform to authorize the event causes the event validation computing platform to execute one or more actions enabling the subordinate user computing device to initiate the event; and
transmit, via the communication interface, to the subordinate user computing device, a notification that the computing platform has transmitted a command directing the event validation computing platform to authorize the event, wherein the notification comprises an identification of the event and at least one piece of information from the command directing the event validation computing platform to authorize the event.

* * * * *